Sept. 13, 1949.  A. H. ROSENTHAL  2,481,620
DEVICE FOR DISPENSING LIQUID FUEL INTO
COMBUSTION AIR OF FURNACES
Filed Feb. 8, 1945
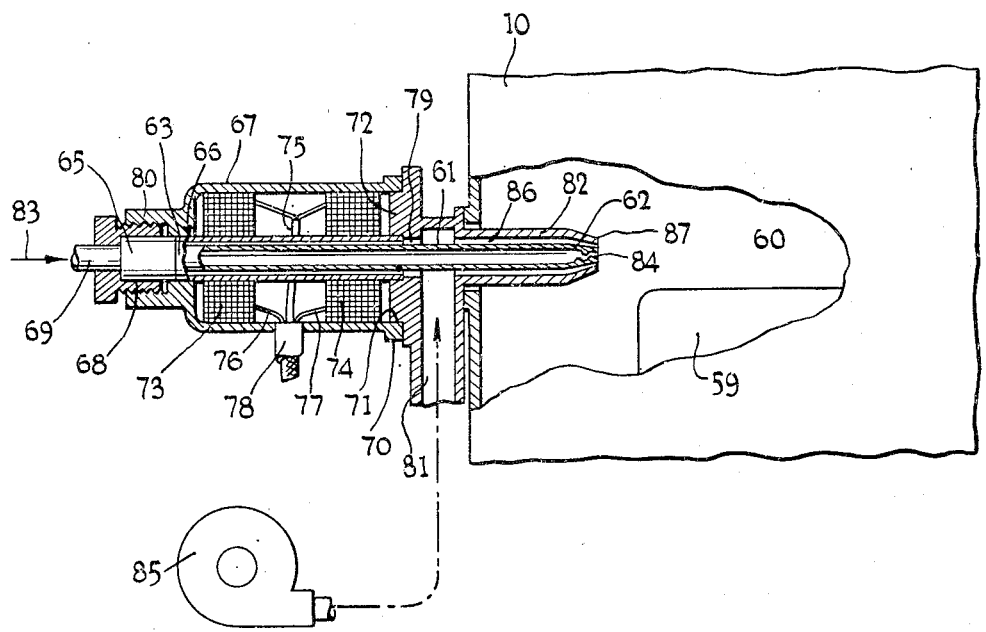
INVENTOR.
ADOLPH H. ROSENTHAL
BY
ATTORNEY Patented Sept. 13, 1949

2,481,620

UNITED STATES PATENT OFFICE 2,481,620

DEVICE FOR DISPENSING LIQUID FUEL INTO COMBUSTION AIR OF FURNACES

Adolph H. Rosenthal, New York, N. Y., assignor, by mesne assignments, to Skiatron Corporation, New York, N. Y., a corporation of New York Application February 8, 1945, Serial No. 576,819

2 Claims. (Cl. 158—77)

This invention relates to a method of and apparatus for dispensing fluid fuel to burners of furnaces of all types, such as for instance heating furnaces, furnaces for boilers, super-heaters, economizers, heaters of air and liquids, such as water, melting furnaces, such as metallurgical and glass furnaces, and the like.

In particular, the invention is suited for dispensing and burning heavy and light fuel oils, and mixtures thereof.

It is an object of the invention to secure complete dispersion or atomisation of the liquid fuel in or before it enters the burner.

It is a further object of the invention to secure the homogeneous admixture of gaseous fuel or dispersed or atomized liquid fuel with combustion air, be it primary air or all of the combustion air, in particular primary and secondary air.

It is another object of the invention to permit and secure convenient and full control of the amount of heat generated by a burner, depending on the load and/or the temperature to be produced, and variations thereof occurring during operation.

It is still a further object of the invention to simplify the structure of devices dispensing liquid fuel to burners and their operations, and thereby to increase the economy of the equipment and its operation.

It is still another object of the invention to secure complete combustion of the fluid fuel supplied to the burner and to reduce to a minimum, or eliminate deposits and waste of unburned fuel.

These and other objects of the invention will be more clearly understood when the specification proceeds with reference to the drawing which shows, in side elevation, with parts in vertical cross section, a dispensing device according to the invention and burner for a melting furnace.

Referring to the drawing, there is shown an embodiment of the invention utilising magneto-striction effects for disintegrating and discharging the fuel into combustion air. There is shown a wall 10 of a furnace for melting or heat treating a batch or mass of material, such as ores, metals, raw material for the manufacture of glass, heat treating, firing or sintering shaped articles of any material, such as shaped metal or ceramic articles. For the sake of simplicity it is assumed that a smelting furnace is concerned, comprising a shell or trough-shaped hearth 59 within furnace chamber 60 and open on its top so that the combustion gases or flame produced by the burner (or burners) can contact a batch placed within the container, support or shell of any known type details of which are not essential for the invention and therefore not shown.

The liquid fuel dispensing device consists in this embodiment of the invention of a tube 61 ending in nozzle 62 and provided at its other end with a short shoulder 63 fitting into another tube 64. Another shoulder 65 of tube 61, still larger in diameter than shoulder 63, fits into bores 66 in a contracted portion 80 of a cylindrical housing 67 and nut 68. A pipe or conduit 69 passes nut 68 and ends within shoulder 65, so that fuel supplied through pipe 69 can enter and pass pipe 61 toward nozzle 62. Flange 70 of housing 67 is seated on shoulder 71 of support 72 and bolted or otherwise secured to the latter. Two coils 73, 74 of insulated wire are slipped over and mounted at the outside of tube 64 spaced from one another. Oscillatory electric energy can be supplied to the coils in parallel through insulated conductor 75 and individually through insulated conductors 76, 77. These three conductors are conveniently combined in a cable 78 passing a hole in housing 67. The coils are first slipped over tube 64 and mounted in proper position thereon; thereupon tube 64 is slipped over tube 61 and both into bore 66 of housing 67; thereupon tube 61 is inserted into hole 79 of support 72 so as to engage a shoulder in front of hole 79 while flange 70 is seated on shoulder 71 and support 72 and secured thereto; thereafter nut 68 is slipped over pipe 69 and screwed into the end 80 of the housing so that shoulder 65 rests on the contacting end of tube 64 and the other end of the latter rests on the shoulder in front of hole 79. Thereby all these parts are securely held in their positions shown in the drawing and tube 61 is spaced from tube 64 and hole 79 and projects freely through duct 81 and burner nozzle 82.

Tube 61 consists of ferromagnetic material exhibiting a so-called magneto-striction effect, such as nickel or alloys known by their trade names "Invar" or "Monel metal." Tube 64 consists of non-magnetic material, such as bronze or brass.

As is known in the art, a magneto-striction effect can be caused by passing recurrently at certain frequency a magnetic flux longitudinally through an elongated body of ferromagnetic material which is freely projecting from its mounting. Each magnetic excitation impulse causes a dilation or expansion and contraction in the longitudinal direction of the freely projecting portion of the elongated body; since one end of the body is rigidly mounted, the other end will as a consequence of those recurring longitudinal dilations and contractions mechanically vibrate at greatest amplitude and in that longitudinal direction. The frequency at which the magnetic flux changes equals the fundamental resonance frequency of the body, or harmonics thereof. Since the body is rigidly held in its mounting, a node is formed there and its free end should be spaced therefrom by ¼, ¾ etc. wave lengths. Therefore, tube 61 which freely projects from its mounting at 65, should be of a length which corresponds to ¼ wave length at resonant vibration frequency. Similar effects are obtained if its length corresponds to ¾, 5⁄4, etc. wave lengths at resonance frequency. A rather high resonance frequency within supersonic range is preferred for the purposes of the invention, resulting in energetic longitudinal vibrations of tube 61 in the direction of its geometrical axis and the amplitude of which is greatest at nozzle 62. The magnetic flux recurrently produced by coils 73, 74 upon excitation by oscillatory electric currents of a frequency corresponding to the resonance frequency of tube 61, or a harmonic thereof, is closed through ferromagnetic tube 61 and not by-passed through tube 64 of nonmagnetic material. Any generator of oscillatory electric energy can be used, particularly of the type illustrated in Fig. 2. Coils 73, 74 translate the electric energy into a varying magnetic flux; they can be used, if so desired, as portions of self-induction coil 52 on both sides of tap 54 or connected with a secondary coil inductively coupled with coil 52 as the primary of a high frequency transformer.

Liquid fuel supplied by gravity or pressed by a fuel pump through tube 69 in the direction of arrow 83, will be subjected to the action of preferably supersonic longitudinal mechanical vibrations of tube 61 the amplitude of which increases toward nozzle 62. The fuel in contact with the inner, exposed surface of tube 61 is taken along and accelerated by tube 62 upon its longitudinal dilation or expansion, and is immediately thereafter retracted upon longitudinal contraction of the tube; this effect increases toward nozzle 62 where the amplitude of the vibrations is greatest, and thus results in tearing or disintegrating the thin fuel column or body proceeding through tube 61 into finest pieces or droplets which eventually emerge and are vehemently ejected from nozzle 62. Projections 84 arranged, if desired, within nozzle 62 were found to increase those effects.

By properly dimensioning the length, thickness and diameter of the freely projecting tube 61 including its nozzle 62 and tuning, according to its resonance vibration frequency, the frequency of the oscillatory energy supplied to coils 73, 74 which translate it into magnetic flux impulses, and also by adjusting the magnitude of that electric energy, the intensity of the longitudinal mechanical vibrations of pipe 61 and thereby the degree of disintegration of the fuel passing it, can be regulated in a purely electric manner, within wide range and gradually or stepwise. The amount of fuel passing tube 61 is measured independently, for instance, by regulating the delivery of a fuel pump in well known manner and therefore not shown.

Combustion air is supplied through duct 81, for instance from a blower 85 the delivery of which can be regulated in well known manner. The combustion air enters the ring space 86 between burner 82 and the outside of tube 61 and discharges in convergent stream into combustion chamber 60 around nozzle 62. Thereby the finely disintegrated fuel thrown off from nozzle 84 is injected into the combustion air and homogeneously admixed with it. If burner nozzle 82 surrounds pipe 61 in the manner shown, air passing space 86 in contact with the longitudinally vibrating tube, may also be subjected to those vibrations to substantial extent, and the density of the discharged air vary accordingly; thereby the admixture of the discharged fuel particles and their integration with the combustion air can be aided.

In particular, if heavy fuel oil is used or a mixture of heavy and light oils, a "mechanical cracking" effect is obtained upon the highly polymerized larger molecules of the heavy oil which are depolymerized or broken down to more volatile smaller molecules.

Complete combustion of the fuel-air mixture occurs almost instantaneously and close to nozzles 62, 87 within furnace chamber 60, and the combustion gases or flame so produced impinge upon the exposed surface of the batch within shell or hearth 59, thereby heating or melting the batch, as the case may be. These gases or flame can be conducted over the shell or hearth in any well known manner, which is not a subject matter of the invention and therefore not shown. If the required entire combustion air is discharged through burner nozzle 82, combustion gases are produced which do not contain any unburned fuel particles which could be deposited upon the batch and in some cases have undesired effects. If the fuel is purified in well known refining processes and thereby inorganic admixtures are removed which might cause deposits of ash, the combustion gases or flame can be used in processes in which any deposits of ash are detrimental or undesired, such as in metallurgical smelting processes requiring high purity of the product, in glass melting processes, in processes for firing china and other ceramic products, etc. Inversely, if the particular heating, firing or smelting processes require a reducing flame, any degree of incomplete combustion can be obtained by purely electric regulation of the disintegrating and dispensing devices according to the invention, and by regulating in well known manner the quantity of air discharged within the time unit; additional air for completely burning the fuel thereafter can be admitted in such cases at any desired part of the furnace chamber in well known manner which does not form a subject matter of the invention. The uses of the combustion gases stated hereinbefore by way of exemplification, equally apply to all the dispensing devices according to the invention herein disclosed and are not limited to the use of magnetostriction principles.

Magneto-striction effects can be used not only for exciting a fuel dispensing tube as illustrated in the drawing to longitudinal vibrations preferably within supersonic high frequency range, but also for actuating a fuel dispensing member, as is described and shown more in detail in my Patent No. 2,453,595.

It should be understood that while only one burner is illustrated in the drawing, any required number of them can be arranged at proper places; the burner or burners may discharge fuel and combustion air horizontally as shown in the drawing, or vertically up- or downwardly, or in inclined direction. Furthermore, a burner of that type can also be used for mere heating purposes in furnaces, fuel and combustion air being discharged vertically upwardly. Similarly, such burners can be used in combustion or furnace chambers of boilers, for instance of any type heretofore known for burning oil or powdered coal, and a number of such burners can be arranged in a side wall of the combustion chamber, in its corners in order to produce whirling motion of the combustion gases through the combustion and heating chamber or chambers of the boiler. However, the uses and embodiments of the invention are not limited to any exemplification hereinbefore described or shown, and the scope of the invention in its broadest aspects is to be derived from the appended claims.

What I claim is:

1. A device for dispensing fluid fuel into combustion air of furnaces, essentially comprising a tubular vibratory member substantially of ferromagnetic material of the type in which recurrent magnetic fluxes can produce magneto-striction effects resulting in mechanical vibrations including recurrent longitudinal contractions and expansions of said member within supersonic, high frequency range, said member having an intake and a discharge end, means for passing combustion air close to said discharge end, means for supplying fluid fuel to said intake end and passing it through said tubular member, and electromagnetic means associated with said member for translating electric current impulses into recurrent magnetic fluxes passing through said member and producing therein said magneto-striction effects and said longitudinal mechanical vibrations, so that fluid fuel passing said tubular member is discharged into the combustion air passing said discharge end.

2. The combination essentially comprising a burner nozzle to discharge into a furnace chamber, a tubular member in said burner, said member substantially of ferromagnetic material of the type in which magnetic fluxes recurrent at supersonic, high frequency can produce magneto-striction effects resulting in mechanical vibrations including longitudinal contractions and expansions of said member in a frequency substantially equalling that of said fluxes, electromagnetic coils associated with said member for translating electric current impulses into magnetic fluxes passing through said member and causing said magneto-striction effects therein, a duct for combustion air outside and around said tubular member, the discharge openings of said member and duct being close to one another, and means for supplying liquid fuel into and passing it through said member towards its discharge opening, so that upon excitation of said mechanical longitudinal vibrations of said member the liquid fuel passing therethrough is disintegrated and dispensed in disintegrated state into combustion air simultaneously discharging from said duct.

ADOLPH H. ROSENTHAL.

REFERENCES CITED

The following references are of record in the file of this patent:

UNITED STATES PATENTS

| Number | Name | Date |
|---|---|---|
| 1,734,975 | Loomis et al. | Nov. 12, 1929 |
| 1,939,302 | Heaney | Dec. 12, 1933 |
| 1,992,938 | Chambers et al. | Mar. 5, 1935 |
| 2,102,800 | Killmeyer et al. | Dec. 21, 1937 |
| 2,291,046 | Lange | July 28, 1942 |

FOREIGN PATENTS

| Number | Country | Date |
|---|---|---|
| 508,582 | Great Britain | July 11, 1939 |